US005317572A

United States Patent [19]
Satoh

[11] Patent Number: 5,317,572
[45] Date of Patent: May 31, 1994

[54] HYBRID MULTIPLEX SYNCHRONIZING METHOD AND APPARATUS THEREFOR

[75] Inventor: Junichi Satoh, Kawasaki, Japan

[73] Assignee: Fujitsu Limited, Japan

[21] Appl. No.: 917,811

[22] Filed: Jul. 21, 1992

[30] Foreign Application Priority Data

Jul. 23, 1991 [JP] Japan .................................. 3-182543

[51] Int. Cl.[5] ............................ H04L 7/04; H04J 3/06
[52] U.S. Cl. ................................ 370/105.1; 370/108; 370/111; 370/116
[58] Field of Search .................. 370/105.1, 105, 105.2, 370/108, 100.1, 105.4; 375/106, 111, 116, 114

[56] References Cited

U.S. PATENT DOCUMENTS

| | | | |
|---|---|---|---|
| 4,547,877 | 10/1985 | Lehman et al. | 370/105.1 |
| 4,622,666 | 11/1986 | Graves et al. | 370/105.1 |
| 4,984,238 | 1/1991 | Watanabe et al. | 370/105.1 |
| 5,025,458 | 6/1991 | Casper et al. | 370/105.1 |

Primary Examiner—Wellington Chin
Attorney, Agent, or Firm—Greer, Burns & Crain, Ltd.

[57] ABSTRACT

Disclosed are a hybrid multiplex synchronizing method and apparatus therefor, in which, when time-shared multiplexed data having different frame patterns and different frame lengths are inputted in different phases every time slot, the data are transmitted upon making the phases of the data in each time slot identical. The apparatus stores in advance, in correlation with the time slots, types of frame patterns and frame lengths of time-shared multiplexed data allocated to each time slot, and performs frame-pattern detection processing in correspondence with each of the different frame patterns. A synchronized-phase detection signal is output in response to detection of the frame pattern, and when the synchronized-phase detection signal is generated in response to detection of the frame pattern of the time-shared multiplexed data allocated to each time slot, the time-shared multiplexed data in the each time slot is rearranged in memory, taking into consideration the frame length of these data, based upon the synchronized-phase detection signal. The phases of the data in each of the time slots are then identical to one another.

11 Claims, 18 Drawing Sheets

FIG.19

| SRa | 1 | 2 | 3 | 4 | 5 | 6 ..... | 64 |
|---|---|---|---|---|---|---|---|
| 19 | 20 | 20 | 10 | 5 | 20 | | 20 |
| | 19 | 19 | 9 | 4 | 19 | | 19 |
| | 18 | 18 | 8 | 3 | 18 | | 18 |
| | 17 | 17 | 7 | 2 | 17 | | 17 |
| | 16 | 16 | 6 | 1 | 16 | | 16 |
| | 15 | 15 | 5 | 5 | 15 | | 15 |
| | 14 | 14 | 4 | 4 | 14 | | 14 |
| | 13 | 13 | 3 | 3 | 13 | | 13 |
| | 12 | 12 | 2 | 2 | 12 | | 12 |
| | 11 | 11 | 1 | 1 | 11 | - - - - | 11 |
| | 10 | 10 | 10 | 5 | 10 | | 10 |
| | 9 | 9 | 9 | 4 | 9 | | 9 |
| | 8 | 8 | 8 | 3 | 8 | | 8 |
| | 7 | 7 | 7 | 2 | 7 | | 7 |
| | 6 | 6 | 6 | 1 | 6 | | 6 |
| | 5 | 5 | 5 | 5 | 5 | | 5 |
| | 4 | 4 | 4 | 4 | 4 | | 4 |
| 2 | 3 | 3 | 3 | 3 | 3 | | 3 |
| 1 | 2 | 2 | 2 | 2 | 2 | | 2 |
| 0 | 1 | 1 | 1 | 1 | 1 | | 1 |

SUB-RATE ADDRESS ↑

TIME-SLOT ADDRESS TSa →

- 1: X.50
- 2: DDS 20
- 3: DDS 10
- 4: DDS 5
- 5: INDIVIDUAL NETWORK

HYBRID MULTIPLEX SYNCHRONIZING METHOD AND APPARATUS THEREFOR

BACKGROUND OF THE INVENTION

This invention relates to a hybrid multiplex synchronizing method and an apparatus therefor. More particularly, the invention relates to a hybrid multiplex synchronizing method and apparatus in which a connection can freely be made to communication networks having different frame patterns and different frame lengths.

Data communication equipment is adapted to accept and process a number of items of frame data which arrive from a plurality of various nodes (data communication equipment) via a time-sharing multiplex communication line. Since each item of frame data arrives in a different phase, however, synchronizing processing must be executed in the receiving data communication equipment before the prescribed processing is executed.

In order to perform multiplex synchronizing processing, it is known to use a multiplex synchronizing processing apparatus which has a multiplex synchronizing processor 11 and a frame aligning RAM 12, as illustrated in FIG. 1. When one frame period T is partitioned into N (e.g., 64) time slots TS1~TS64, as illustrated in FIG. 2, time-shared multiplexed data of 64 channels allocated to respective ones of the time slot enter the multiplex synchronizing processor 11. Each item of time-shared multiplexed data is composed of eight bits, in which the first bit is a synchronizing bit (a frame bit), the eighth bit is a status bit (which indicates validity/invalidity), and the remaining bits are data. In a case where one frame has a period of 8K, the frame data (parallel data) has a speed of 512K. Furthermore, one sub-rate frame is composed of 20 frames.

In an ideal case in which synchronization has been achieved, as shown in FIG. 3 (where the frame length is assumed to be 20), the frame bit of all data in time slots TS1~TS64 in a first frame FP1 is S1, the frame bit of all data in time slots TS1~TS64 in a second frame FP2 is S2, the frame bit of all data in time slots TS1~TS64 in a third frame FP3 is S3, . . . , and the frame bit of all data in time slots TS1~TS64 in a 20th frame FP20 is S20. Furthermore, as shown in FIG. 4, a synchronization pattern (referred to as a frame pattern) of 20 bits synchronized to the sub-rate frame (which is equivalent to 20 frames) is constructed by lining up the 20 frame bits in the manner

S1, S2, S3, . . . , S20.

The multiplex synchronizing processor 11 (FIG. 1) rearranges the 20 frames of data (64 time slots×20 items of data), which are inputted in different phases, every time slot TS in the order of the frame bits and stores these data in the frame aligning RAM 12. For example, when the data of 64 time slots in each of frames FP1~FP20 enter in respectively different phases, as shown in FIG. 5A, these data are arranged by synchronizing processing in the frame aligning RAM 12, as shown in FIG. 5B, and the data eventually are rearranged and stored in the frame aligning RAM 12 as illustrated in FIG. 3. Thereafter, data of 64 time slots each are outputted every frame starting from the first frame of the frame aligning RAM 12.

More specifically, as depicted in FIG. 5B, the frame aligning RAM 12 has an address space composed of time-slot addresses (TS addresses) 1~64 of 64 time slots along the horizontal axis and sub-rate addresses 0~19 of 20 frames along the vertical axis. The multiplex synchronizing processor 11 identifies the frame-bit position of the inputted data in each time slot, subsequently outputs data of 64 time slots of the first frame bit S1 (namely data stored at sub-rate address 0, these data being indicated by the hatching), and then successively outputs the data of 64 time slots of the second frame bit S2, the data of 64 time slots of the second frame bit S3, . . . , and so on.

FIG. 6 illustrates the overall time chart of synchronizing processing and shows a frame synchronizing clock (512K), the data in each time slot, timing FAIN of data input to the frame aligning RAM, and timing FAOUT of data readout from the frame aligning RAM. The multiplex synchronizing processor 11 accepts the frame data, applies synchronizing processing and inputs the result to the frame aligning RAM 12 in the first half-period of the frame synchronizing clock, and reads the synchronized frame data out of the frame aligning RAM 12 and outputs the data in the second half-period of the frame synchronizing clock.

FIG. 7 is an overall view of the system in a single frame pattern network (an X.50 network, by way of example). Numerals 1~3 denote X.50 networks recommended by the CCITT, 4 a data multiplex communication apparatus, and PT1~PT3 time-sharing multiplex communication lines. In the data multiplex communication apparatus 4, numerals 4a~4c denote interface networks, 4d an internal bus, and 4e a multiplex synchronizing processing apparatus (see FIG. 1).

Time-shared multiplexed data strings TSD1~TSD3 of N channels (ch1~chN) per frame are inputted to the data multiplex communication apparatus 4 from the X.50 networks via the lines PT1~PT3, respectively. The numerals 1~20 in each of the time-shared multiplexed data strings TSD1~TSD3 indicate the positions of the respective frame bits

S1, S2, S3, . . . , S20.

It should be noted that, with regard to the same channel (time slot) of each frame in the time-shared multiplexed data strings, the frame bits are always arranged in the manner →S1→S2→S3→ . . . S20→S1→S2→ . . . in the order of arrival.

In the data multiplex communication apparatus 4, if the data of ch2 on line PT1, ch1 on line PT2, ch1 on line PT2, . . . are accepted and outputted upon being subjected to multiplex synchronizing processing, the data are successively extracted from each of the interfaces 4a~4c, arranged as shown in FIG. 8 and inputted to the multiplex synchronizing processing apparatus 4e. The frame patterns of the data allocated to the time slots TS1, TS2, TS3, . . . differ in phase in the manner

S19, S20, S1, . . .
S1, S2, S3, . . .
S7, S8, S9, . . .

Accordingly, through the method described in FIGS. 1 through 6, the multiplex synchronizing processing apparatus 4e aligns the phases of the frame patterns of the data allocated to the time slots.

In accordance with the conventional multiplex synchronizing method, as set forth above, if the data are data received from identical networks (e.g., X.50 networks) having the same frame pattern and the same frame length, the phases can be made to conform by synchronizing processing if the phases of the data differ.

With the conventional multiplex synchronizing method, however, the phases cannot be made to conform if the data are received in different phases from networks (multiplex networks) having different frame patterns and different frame lengths.

Consequently, it is necessary to newly and individually provide multiplex synchronizing processing apparatuses corresponding to the frame patterns and frame lengths which are specific to networks other than the X.50 networks. As a result, there is an increase in the amount of hardware and a flexible network configuration is not possible.

SUMMARY OF THE INVENTION

Accordingly, an object of the present invention is to provide a hybrid multiplex synchronizing method and apparatus in which it is possible to achieve phase conformity of time-shared multiplexed data received in different phases from networks having different frame patterns and different frame lengths, and in which a flexible network configuration can be obtained.

Another object of the invention is to provide a hybrid multiplex synchronizing method and apparatus in which, even if time-shared multiplexed data are inputted in different phases from networks having different frame patterns and different frame lengths, the time-shared multiplexed data in each of the time slots can be rearranged and made to agree in phase efficiently in a frame aligning RAM.

A further object of the invention is to provide a hybrid multiplex synchronizing method and apparatus in which the amount of hardware can be reduced and lowered in cost by arranging it so that the components of a plurality of multiplex synchronizing processors each provided for a different frame pattern are shared.

According to the present invention, the foregoing objects are attained by providing a hybrid multiplex synchronizing method comprising a step of storing in advance, in correlation with time slots, types of frame patterns and frame lengths of time-shared multiplexed data allocated to each time slot, a step of providing multiplex synchronizing processors corresponding to respective ones of different frame patterns, performing frame-pattern detection processing in each of the multiplex synchronizing processors whenever a frame bit constituting a frame pattern is inputted, and outputting a synchronized-phase detection signal in response to detection of the frame pattern, and a step, which is executed when the synchronized-phase detection signal is generated by a multiplex synchronizing processor conforming to the type of frame pattern which corresponds to a present time slot, of rearranging the time-shared multiplexed data in memory, upon taking into consideration the frame length of these data, based upon the synchronized-phase detection signal, and similarly rearranging the time-shared multiplexed data of each time slot in memory to make the phases of the items of time-shared multiplexed data identical to one another.

According to the present invention, the foregoing objects are attained by providing a hybrid multiplex synchronizing apparatus having a memory for storing in advance, in correlation with time slots, types of frame patterns and frame lengths of time-shared multiplexed data allocated to each time slot. Multiplex synchronizing processors are provided in correspondence with respective ones of different frame patterns for performing, for every time slot, frame-pattern detection of the time-shared multiplexed data allocated to each time slot. The multiplex synchronizing processors output a synchronized-phase detection signal in response to detection of the frame pattern. A frame aligning RAM has m-number of storage areas which are first, second, . . . , m-th storage areas for every time slot, in which m represents maximum frame length. A selector is provided for selecting and outputting the synchronized-phase detection signal generated by a multiplex synchronizing processor conforming to the type of frame pattern which corresponds to a present time slot. A phase synchronizer, on the basis of the synchronized-phase detection signal generated every time slot, stores the time-shared multiplexed data of each time slot in the corresponding m-number of storage areas of the frame aligning RAM in order, starting from the first storage area upon taking into consideration the frame length. Based upon the synchronized-phase detection signal, the phase synchronizer makes the phases of the items of time-shared multiplexed data of each time slot identical to one another.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 19 is a diagram for describing the storage of data in a frame aligning RAM.

DESCRIPTION OF THE PREFERRED EMBODIMENT

Figure 9:
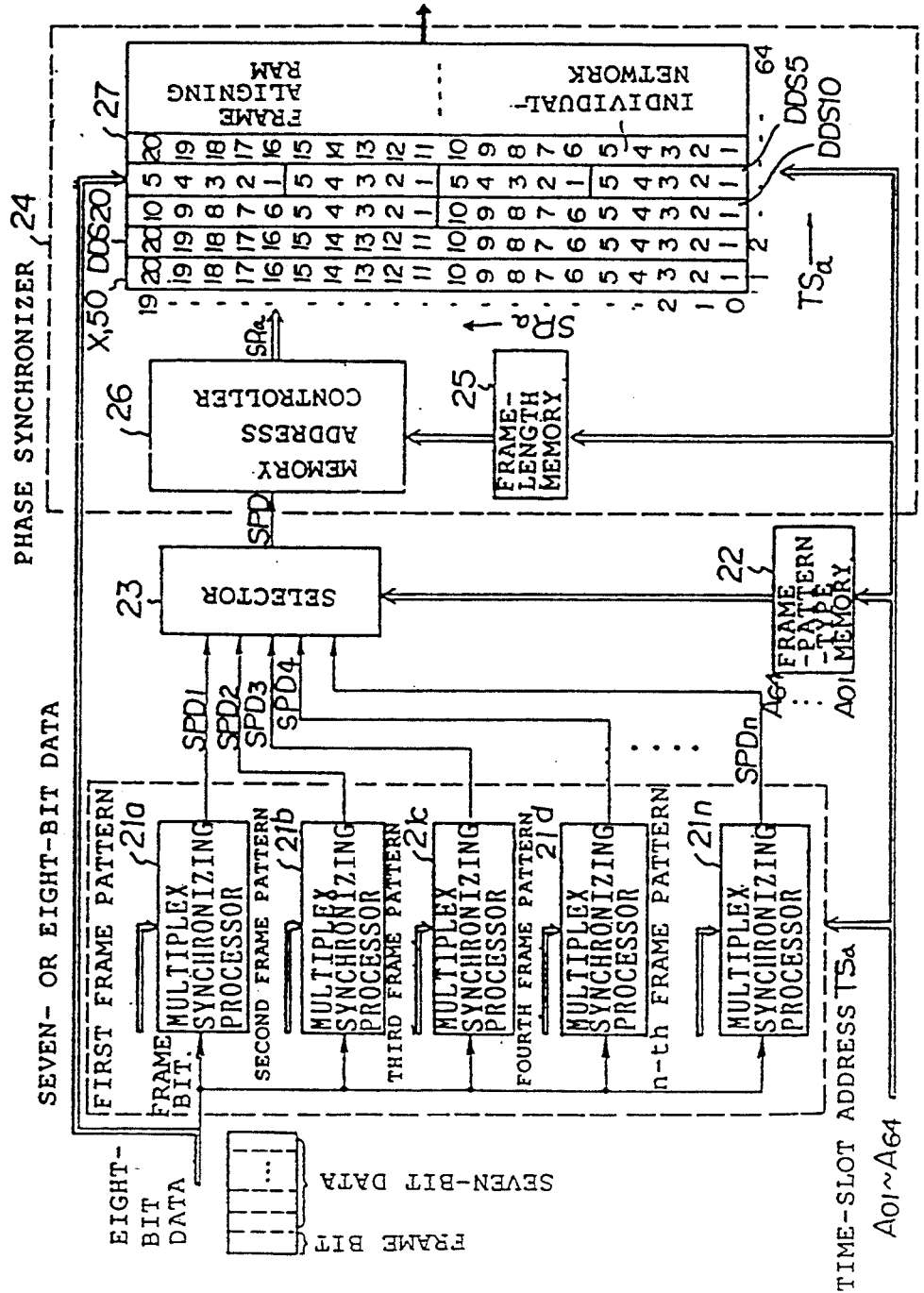
FIG. 9 is a block diagram for describing the general features of the present invention.

FIG. 9 is a block diagram for describing the general features of the present invention. Numerals 21a~21n denote first through n-th multiplex synchronizing processors provided in correspondence with respective ones of different frame patterns (first~n-th patterns) for performing multiplex synchronizing processing whenever a frame bit is inputted thereto, and outputting synchronized-phase detection signals SPD1~SPDn. A frame-pattern-type memory 22 is for storing, in advance, the types of frame patterns of time-shared multiplexed data allocated to time slots TS1~TSN (e.g., TS1~TS64). A selector 23 selects whichever of the synchronized-phase detection signals SPD1~SPDn from the multiplex synchronizing processors 21a~21n conforms to the type of frame pattern in the present time slot. A phase synchronizer 24 rearranges the time-shared multiplexed data of each time slot in memory (the frame aligning RAM) upon taking the frame length of the data into consideration, thereby bringing the phases into conformity. The phase synchronizer 24 includes a frame-length memory 25 for storing, in advance, the frame lengths of the time-shared multiplexed data allocated to the time slots TS1~TSN (e.g., TS1~TS24), a memory address controller 26 which, in response to generation of the synchronized-phase detection signal SPD in each time slot, generates an address for rearranging the time-shared multiplexed data of the time slot in the frame aligning RAM upon taking the frame length of the data into consideration, and a frame aligning RAM 27 having an address space composed of TS addresses 1~64 of 64 time slots along the horizontal axis and sub-rate addresses 0~19 of 20 frames along the vertical axis. The frame aligning RAM 27 has its address position designated by a TS address TSa, which specifies what the number of the time slot is, and a sub-rate address SRa specifying the bit position of the frame pattern. That is, the RAM 27 has m (=20) storage areas for every time slot, and the time-shared multiplexed data are stored in the storage area designated by the sub-rate address SRa outputted from the memory address controller 26 every time slot.

It will be assumed here that data of N (=64) channels of different frame patterns and different frame lengths inputted in different phases are allocated to respective ones of 64 time slots, after which multiplex synchronizing processing is executed. The types of frame patterns of the data allocated to each of the time slots TS1~TS64 are stored beforehand at addresses A01-~A64 of the frame-pattern-type memory 22, and the frame lengths of the data allocated to the time slots TS1~TS64 are stored beforehand at the addresses A01-~A64 of the frame-length memory 25. The multiplex synchronizing processors 21a~21n provided for corresponding ones of different frame patterns (first through n-th frame patterns) perform multiplex synchronizing processing at each input of a frame bit, which is the leading bit of the data, and output the synchronized-phase detection signals SPD1~SLDn when they detect frame patterns designated for them. The selector 23 selects whichever of the synchronized-phase detection signals SPD1~SPDn from the multiplex synchronizing processors 21a~21n conforms to the type of frame pattern in the present time slot, and inputs this signal to the phase synchronizer 24. In response to generation of the synchronized-phase detection signal SPD in each time slot, the phase synchronizer 24 rearranges the data of the time slot upon taking the frame length of the data into consideration, stores the rearranged data in the frame aligning RAM 27 every time slot in the order of the frame bits (the order of the sub-rate addresses) and makes the phases of the items of data identical. Thereafter, the 64 time slots of data are successively outputted every frame starting from the first-frame bit position (sub-rate address 0) of frame aligning RAM 12. The numerals 1~20 in the frame aligning RAM 27 indicate the storage positions of the data of frame bits S1~S20.

Thus, a multiplex synchronizing processor is provided for each different frame pattern in the various networks. When each processor detects a frame pattern designated for itself, the processor generates the synchronized-phase detection signal. In response to generation of the synchronized-phase detection signal in each time slot, the data of the time slot are rearranged in the memory (the frame aligner) upon taking the frame length into consideration, and the phases of the data are made identical before the data are outputted. As a result, even if networks having different frame patterns and different frame lengths are mixed and data having different phases are received from the networks, the phases can be made to conform and a flexible network configuration is possible.

Figure 10:
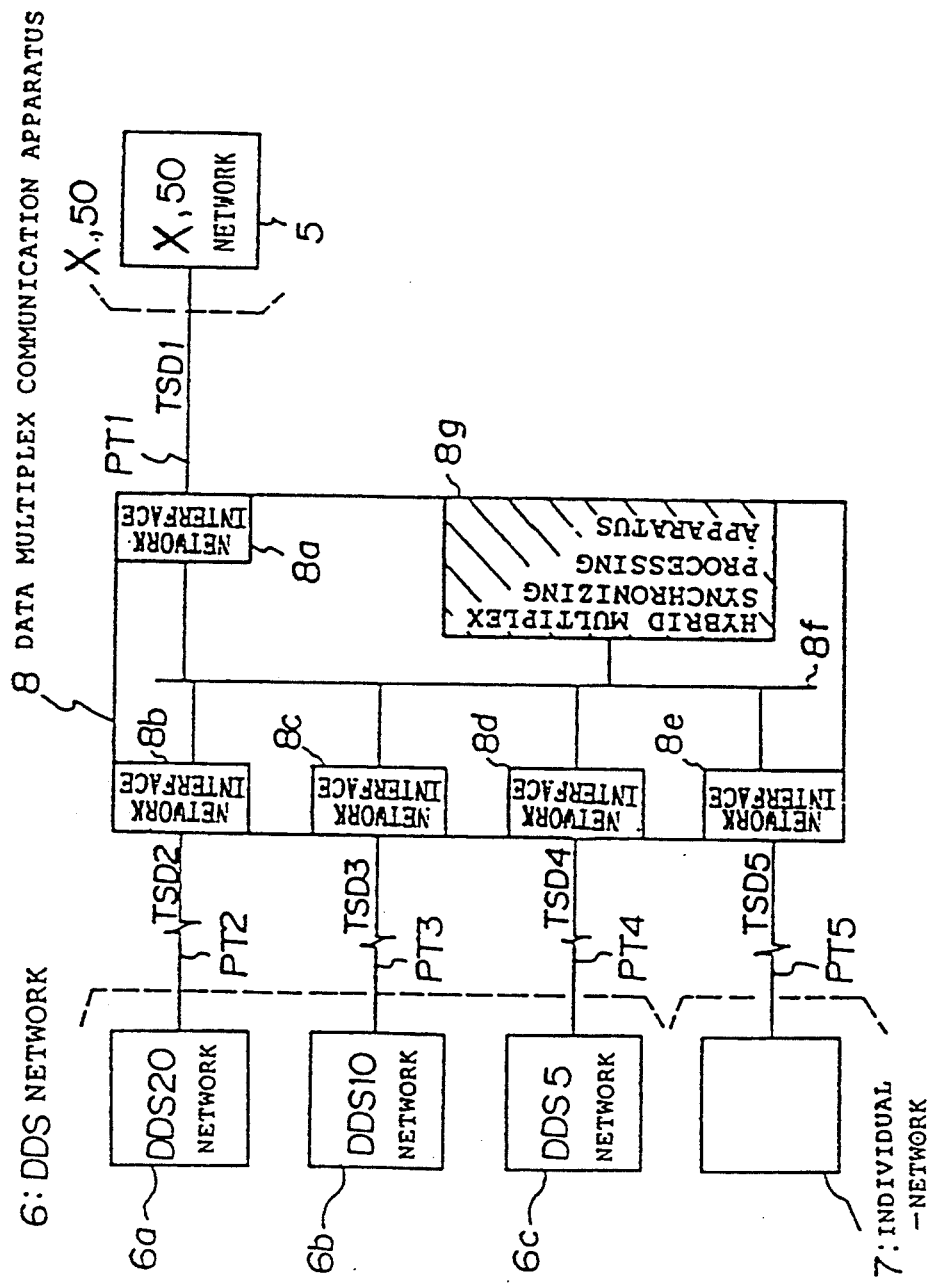
FIG. 10 is a block diagram showing a communication system.

FIG. 10 is a block diagram of a communication system and is for describing the positioning of a data multiplex communication apparatus which executes the hybrid multiplex synchronizing processing according to the present invention. Shown are an X.50 network (used mainly in Japan) 5 in which frame length is 20, and DDS networks (used mainly in North America) 6, which include a DDS20 network 6a in which frame length is 20, a DDS10 network 6b in which frame length is ten, and a DDS5 network 6b in which frame length is five. Also shown are an individual network (a special network) 7 having its own frame pattern in which frame length is 20, a data multiplex communication apparatus 8, and time-sharing multiplex communication lines PT1~PT5.

The data multiplex communication apparatus 8 includes interfaces 8a~8e for the various networks, an internal bus 8f, and a hybrid multiplex synchronizing processing apparatus 8g for aligning the phases of data having different frame patterns and different frame lengths inputted from the various networks in different phases, multiplexing the data and then outputting the same.

When the time-sharing data TSD1~TSD5 of N channels per frame enter from the X.50 network 5, DDS20 network 6a, DDS10 network 6b, DDS5 network 6c and individual network (special network) 7 via the lines PT1~PT5, the data multiplex synchronizing processing apparatus accepts the data of a predetermined channel on each line, executes hybrid multiplex synchronizing processing, described later, and outputs the results.

Hybrid Multiplex Synchronizing Processing Apparatus

Figure 11:
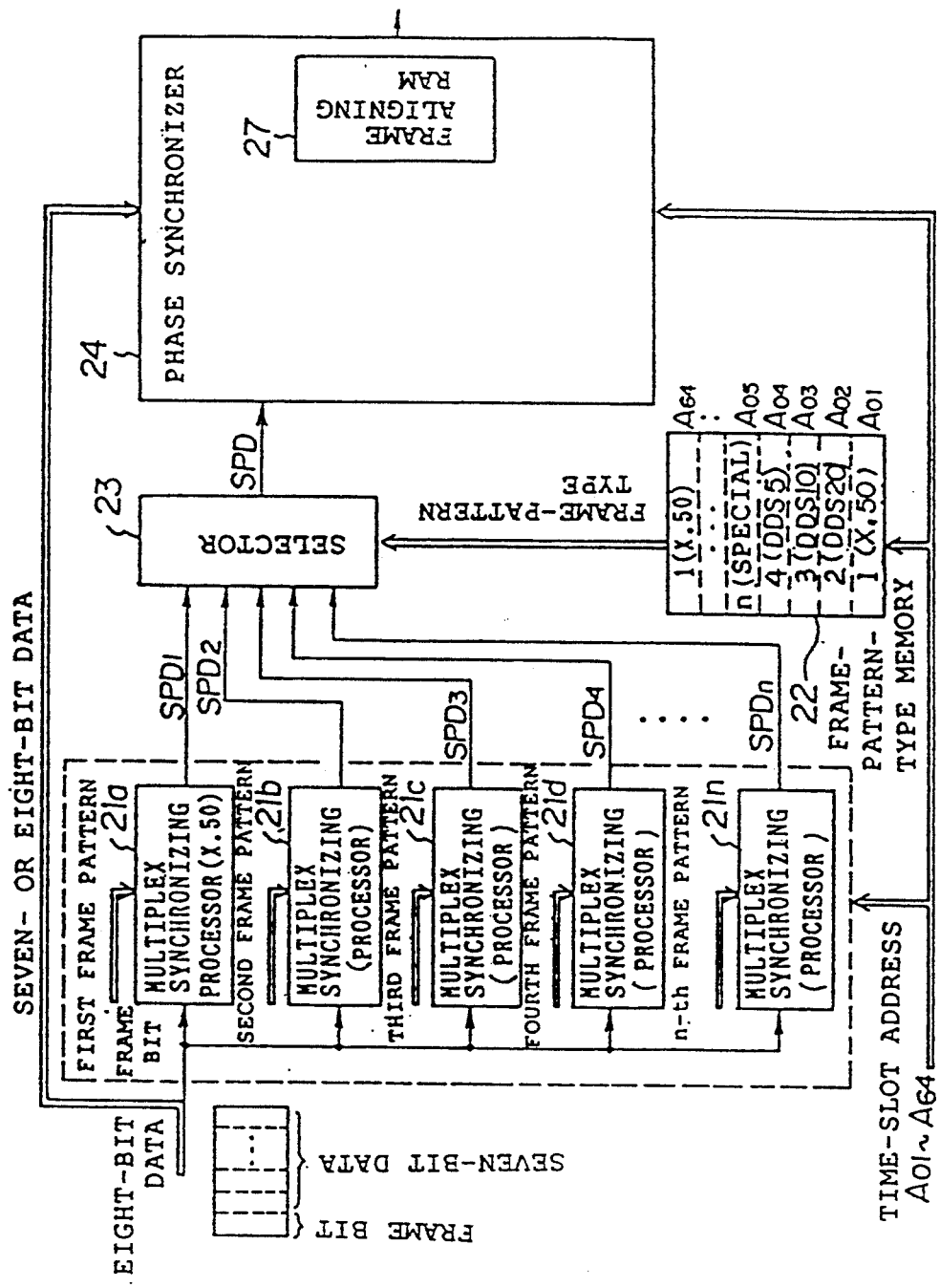
FIG. 11 is an overall block diagram of a hybrid multiplex synchronizing processing apparatus.

FIG. 11 is an overall block diagram of the hybrid multiplex synchronizing processing apparatus according to the present invention. Numerals 21a~21n denote the first through n-th multiplex synchronizing processors provided in correspondence with respective ones of different frame patterns (first~n-th patterns) for performing multiplex synchronizing processing whenever a frame bit is inputted thereto. The frame-patterntype memory 22 stores the types of frame patterns of the data allocated to the time slots TS1~TSN (e.g., TS1~TS64). The selector 23 selects whichever of the synchronized-phase detection signals SPD1~SPDn from the multiplex synchronizing processors 21a~21n conforms to the type of frame pattern in the present time slot. The phase synchronizer 24 rearranges the data of each time slot in the frame aligning RAM 27 upon taking the frame length of the data into consideration, thereby bringing the phases into conformity.

The different frame patterns (first~n-th patterns) are set beforehand in respective ones of the first, second, third, . . . n-th multiplex synchronizing processors 21a~21n by hardware or software means. By way of example, a 20-bit frame pattern for the X.50 network is set as the first frame pattern, a 20-bit frame pattern for the DDS20 network is set as the second frame pattern, a 10-bit frame pattern for the DDS10 network is set as the third frame pattern, a 5-bit frame pattern for the DDS5 network is set as the fourth frame pattern, . . . , and a 20-bit frame pattern for the individual network (special network) is set as the n-th frame pattern.

Frame-pattern-type Memory

The types of frame patterns of data allocated to the time slots TS1~TSN (e.g., TS1~TS64) are stored in the frame-pattern-type memory 22 in advance. In a case where a plurality of items of data from a plurality of networks having different frame patterns and different frame lengths are allocated to the time slots TS1~TSN, to which of the time slots TS1~TSN the data are allocated, as well as the particular networks (the frame pattern) from which these data derive, is decided beforehand. Accordingly, this agreement (the types of frame patterns of the data allocated to the time slots TS1~TSN) is stored in the frame-pattern-type memory 22 in advance. By way of example, (1) the data of the X-50 network are allocated to the first time slot TS1;
(2) the data of the DDS20 network are allocated to the second time slot TS2;
(3) the data of the DDS10 network are allocated to the third time slot TS3;
(4) the data of the DDS5 network are allocated to the fourth time slot TS4;
(5) the data of the special network are allocated to the fifth time slot TS5;

and so on.

If the data of the prescribed networks have been allocated to each of the time slots in this manner, then data will be stored at the addresses A01~A64 (which correspond to time slots TS1~TS64) of the frame-pattern-type memory 22 as follows, as illustrated in FIG. 11:

(1) data specifying the first frame pattern (the frame pattern for the X.50 network) are stored at address A01;
(2) data specifying the second frame pattern (the frame pattern for the XDDS20 network) are stored at address A02;
(3) data specifying the third frame pattern (the frame pattern for the XDDS10 network) are stored at address A03;
(4) data specifying the fourth frame pattern (the frame pattern for the XDDS5 network) are stored at address A04;
(5) data specifying the n-th frame pattern (the frame pattern for the individual network) are stored at address A05;

and so on. Thereafter, and in similar fashion, the data (the type of frame pattern) specifying each frame pattern are stored at each of the addresses.

The 1st~n-th multiplex synchronizing processors 21a~21n provided for corresponding ones of the n-type of different frame patterns execute multiplex synchronizing processing whenever the frame bit (the leading bit of the data) attached to the data of the present time slot enters. When the processors detect the frame patterns designated for them, they output the synchronized-phase detection signals SPD1~SPDn.

The type of frame pattern in the present time slot is inputted to the selector 23 from the frame-pattern-type memory 22, and the selector 23 selects whichever of the synchronized-phase detection signals SPD1~SPDn from the multiplex synchronizing processors 21a~21n conforms to the frame-pattern type.

In response to generation of the synchronized-phase detection signal SPD in the present time slot, the phase synchronizer 24 rearranges the data of the time slot in the frame aligning RAM 27 upon taking the frame length of the data into consideration, stores the rearranged data in the frame aligning RAM 27 every time slot in the order of the frame bits and makes the phases of the items of data identical before outputting the data.

Construction of Multiplex Synchronizing Processors

Figure 12:
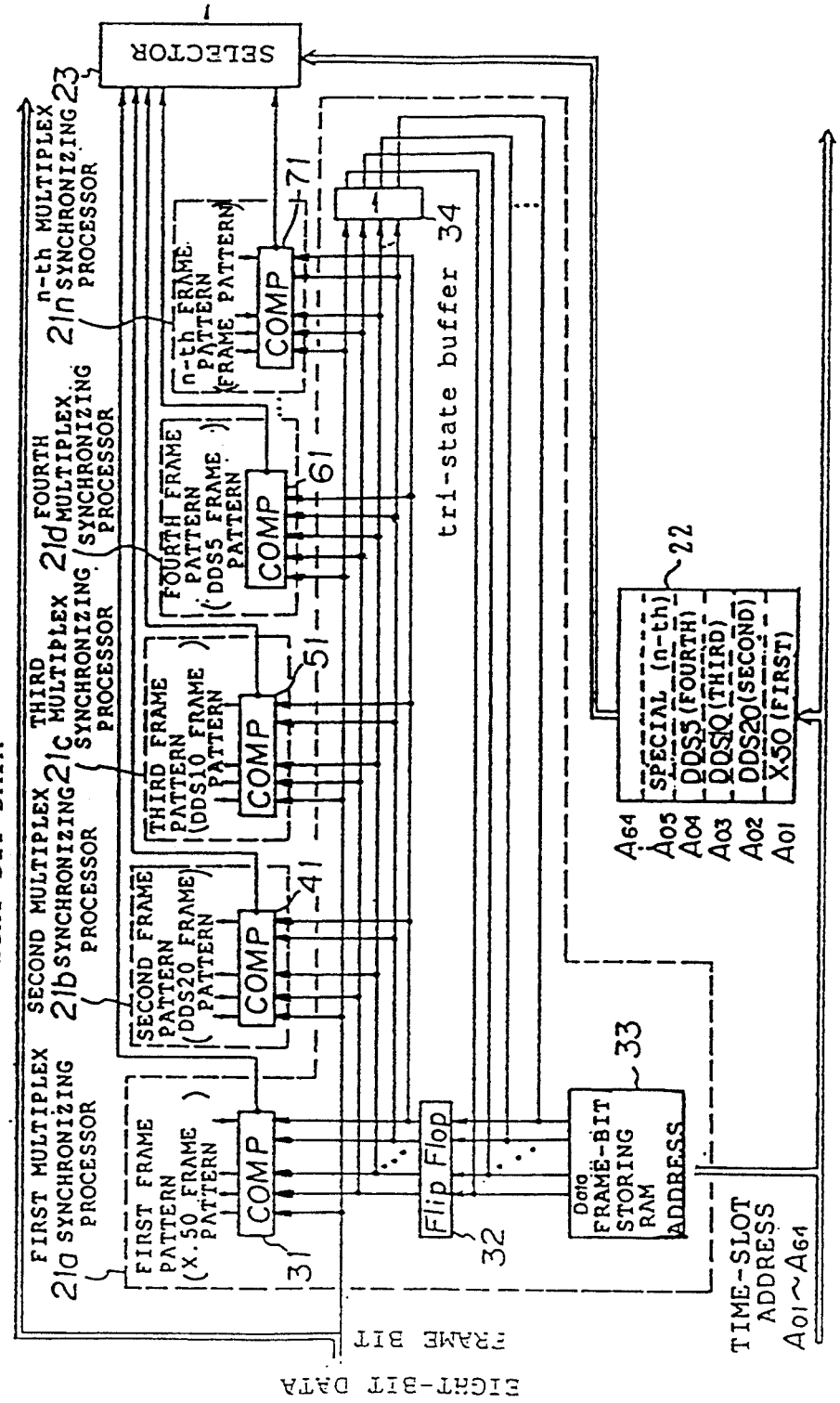
FIG. 12 is an overall block diagram of a multiplex synchronizing processing apparatus.

FIG. 12 is a specific block diagram showing the construction of each of the multiplex synchronizing processors. The first multiplex synchronizing processor 21a includes a comparator (COMP) 31, a flip-flop 32, a frame-bit storing RAM 33 and a tri-state buffer 34. The 2nd~n-th multiplex synchronizing processors 21b~21n have comparators 41, 51, 61, 71, respectively, and it should be noted that these processors 21b~21n share the flip-flop 32, frame-bit storing RAM 33 and tri-state buffer 34 of the first multiplex synchronizing synchronizing processor 21a.

Figure 13:
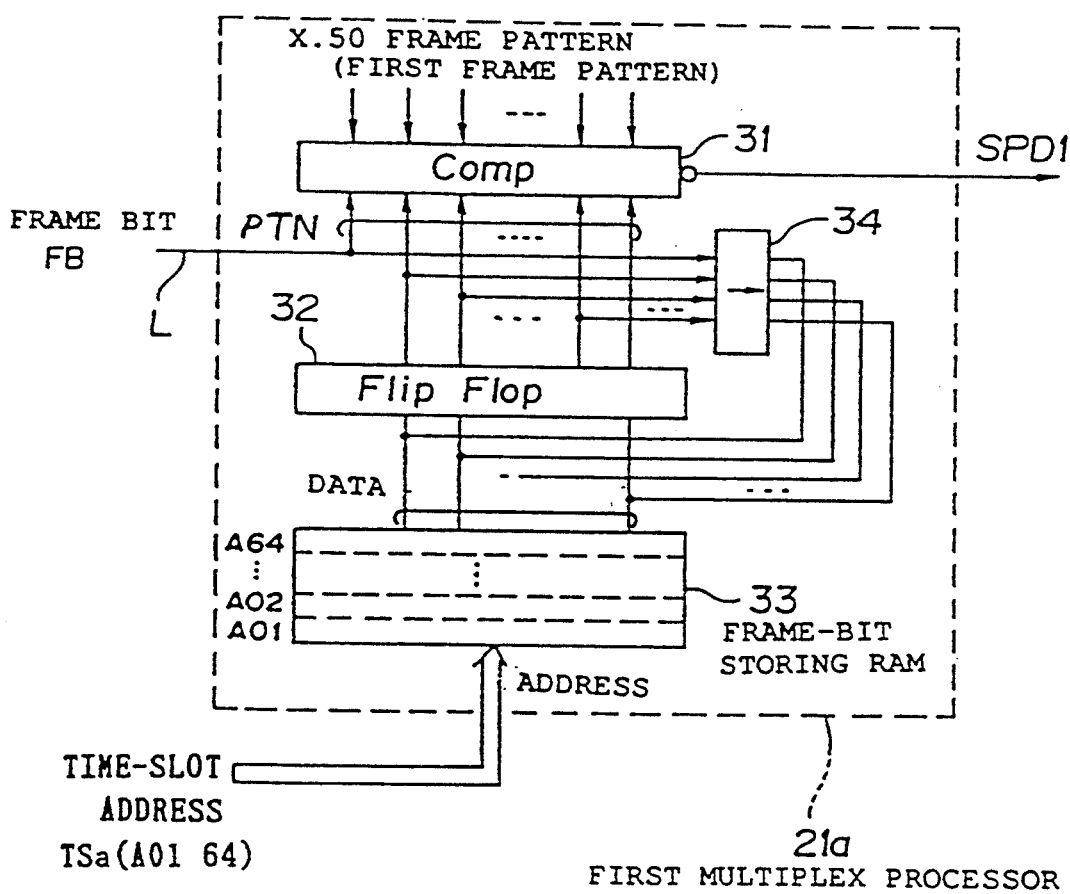
FIG. 13 is a detailed view of the construction of one multiplex synchronizing processor.

FIG. 13 shows solely the first multiplex synchronizing processor 21a. The frame-bit storing RAM 33 is provided with storage areas (addresses A01~A64) for respective ones of the time slots (TS1~TS64). The arrangement is such that 19 of the latest frame bits (the total number of frame-pattern bits minus one bit) FB that have arrived at the time of a prescribed time slot are stored at the pertinent address while the stored contents are shifted by one bit. The contents stored at each address of the frame-bit storing RAM 33 shall be referred to as a "frame-bit string".

The flip-flop 32 reads the 19-bit frame-bit string in the present time slot out of the pertinent address of the frame-bit storing RAM 33 and temporarily stores these data.

The comparator 31 compares a pattern PTN with the already set frame pattern (the first frame pattern) for the X.50 network. The pattern PTN is composed of the frame bit FP, which is inputted from line L at the time of a prescribed time slot TSi, as the first bit, and the 19 bits of the frame-bit string of the time slot TSi stored in the flip-flop 32, these 19 bits being the 2nd~20th bits. If the two compared patterns coincide, then the comparator 31 outputs the synchronized-phase detection signal SPD1.

At the completion of the comparison, the tri-state buffer 34 stores the first bit of the 20-bit pattern PTN as the second bit, stores the second bit as the third bit, ..., stores the 19th bit and the 20th bit. In other words, the buffer 34 shifts the pattern PTN and stores it at the address Ai of the frame-bit storing RAM 33 conforming to the time slot TSi.

With regard to identical time slots, the frame bits are always arranged in the manner S20→S1→S2→S3→ ... →S20→S1→S2→in the order of arrival. Accordingly, when the first multiplex synchronizing processor 21a is constructed as shown in FIG. 13, the pattern PTN and the first frame pattern (S1→S2→S3→ ... →S20) will coincide, and the synchronized-phase detection signal SPD1 will be outputted, every 20 frames.

Operation of Synchronized-phase Detection

Figure 14:
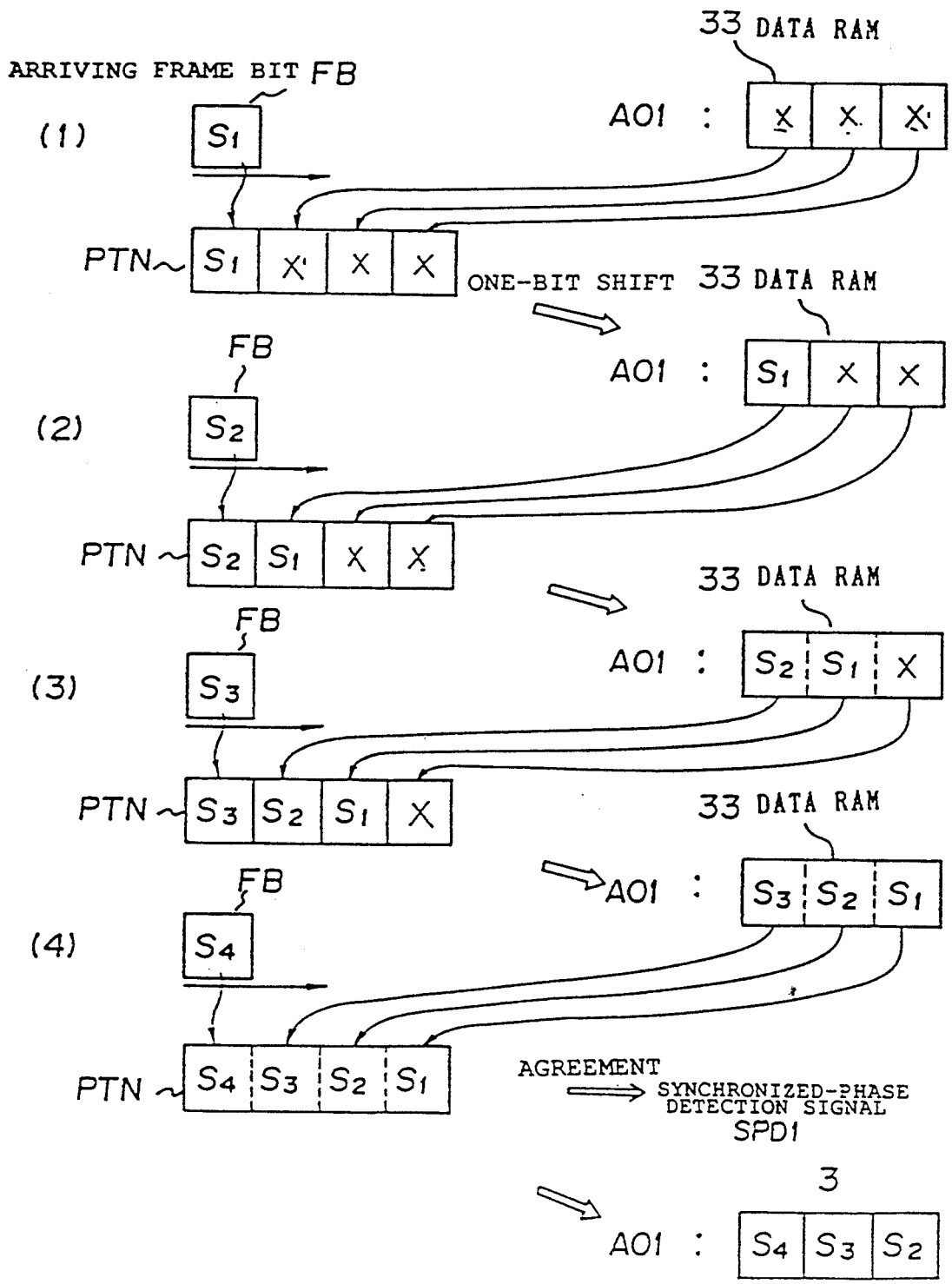
FIG. 14 is a diagram for describing a frame-pattern detecting operation performed by the multiplex synchronizing processor.

FIG. 14 is a diagram for describing synchronized-phase detection processing in a case where the first frame pattern is composed of the four bits "S4, S3, S2, S1" for the sake of simplicity.

Initially, the content (the frame-bit string) at the address A01 corresponding to the time slot TS1 of the frame-bit storing RAM 33 is "x, x, x" (where x is indeterminate).

When the time slot TS1 prevails and the frame bit FB (let this be S1) attached to the data of this time slot arrives under these conditions, the pattern PTN and the first frame pattern (S4, S3, S2, S1) are compared, in which the pattern PTN has the above-mentioned frame bit FB as the first bit and frame-bit string "x, x, x" as the second through fourth bits. Since the compared patterns do not agree, however, the synchronized-phase detection signal SPD1 is not outputted and the pattern PTN is shifted one bit and stored at the address A01 of the frame-bit storing RAM 33 [see (1) in FIG. 14].

When the next time slot TS1 prevails and the frame bit FB (S2) arrives upon passage of the time period of one frame, the pattern PTN "S2, S1, x, x" is compared with the first frame pattern (S4, S3, S2, S1), in which the pattern PTN has the above-mentioned frame bit FB as the first bit and frame-bit string "S1, x, x" as the second through fourth bits. Since the compared patterns do not agree, however, the synchronized-phase detection signal SPD1 is not outputted and the pattern PTN is shifted one bit and stored at the address A01 of the frame-bit storing RAM 33 [see (2) in FIG. 14].

When the next time slot TS1 prevails and the frame bit FB (S3) arrives upon passage of the time period of one frame, the pattern PTN "S3, S2, S1, x" is compared with the first frame pattern (S4, S3, S2, S1), in which the pattern PTN has the above-mentioned frame bit FB as the first bit and frame-bit string "S2, S1, x" as the second through fourth bits. Since the compared patterns do not agree, however, the synchronized-phase detection signal SPD1 is not outputted and the pattern PTN is shifted one bit and stored at the address A01 of the frame-bit storing RAM 33 [see (2) in FIG. 14].

When the next time slot TS1 prevails and the frame bit FB (S3) arrives upon passage of the time period of one frame, the pattern PTN "S4, S3, S2, S1" is compared with the first frame pattern (S4, S3, S2, S1), in which the pattern PTN has the above-mentioned frame bit FB as the first bit and frame-bit string "S3, S2, S1" as the second through fourth bits. Since the compared patterns agree in this case, the synchronized-phase detection signal SPD1 is outputted and the pattern PTN is shifted one bit and stored at the address A01 of the frame-bit storing RAM 33 [see (4) in FIG. 14].

Thereafter, agreement is achieved and the synchronized-phase detection signal SPD1 is outputted every four frames, and data phase synchronization is performed by the phase synchronizer 24, which is the next stage. It should be noted that since the actual frame pattern for X.50 is composed of 20 bits, agreement is achieved every 20 frames.

The foregoing is for a case in which synchronized-phase detection of the first frame pattern (X.50 network) is performed. However, synchronized-phase detection of the second frame pattern (DDS20 network), third frame pattern (DDS10 network), fourth frame pattern (DDS5 network), ..., n-th frame pattern (special network) also can be carried out in the same manner in parallel with synchronized-phase detection of the first frame pattern by sharing the flip-flop 32, frame-bit storing RAM 33 and tri-state buffer 34. However, in case of the DDS10 network in which the frame length is ten, the third frame pattern is composed of ten bits. Therefore, the comparator 51 performs the comparison operation solely with regard to the leading ten bits. In case of the DDS5 network in which the frame length is five, the fourth frame pattern is composed of five bits, and therefore the comparator 61 performs the comparison operation solely with regard to the leading five bits.

Phase Synchronizer

Figure 15:
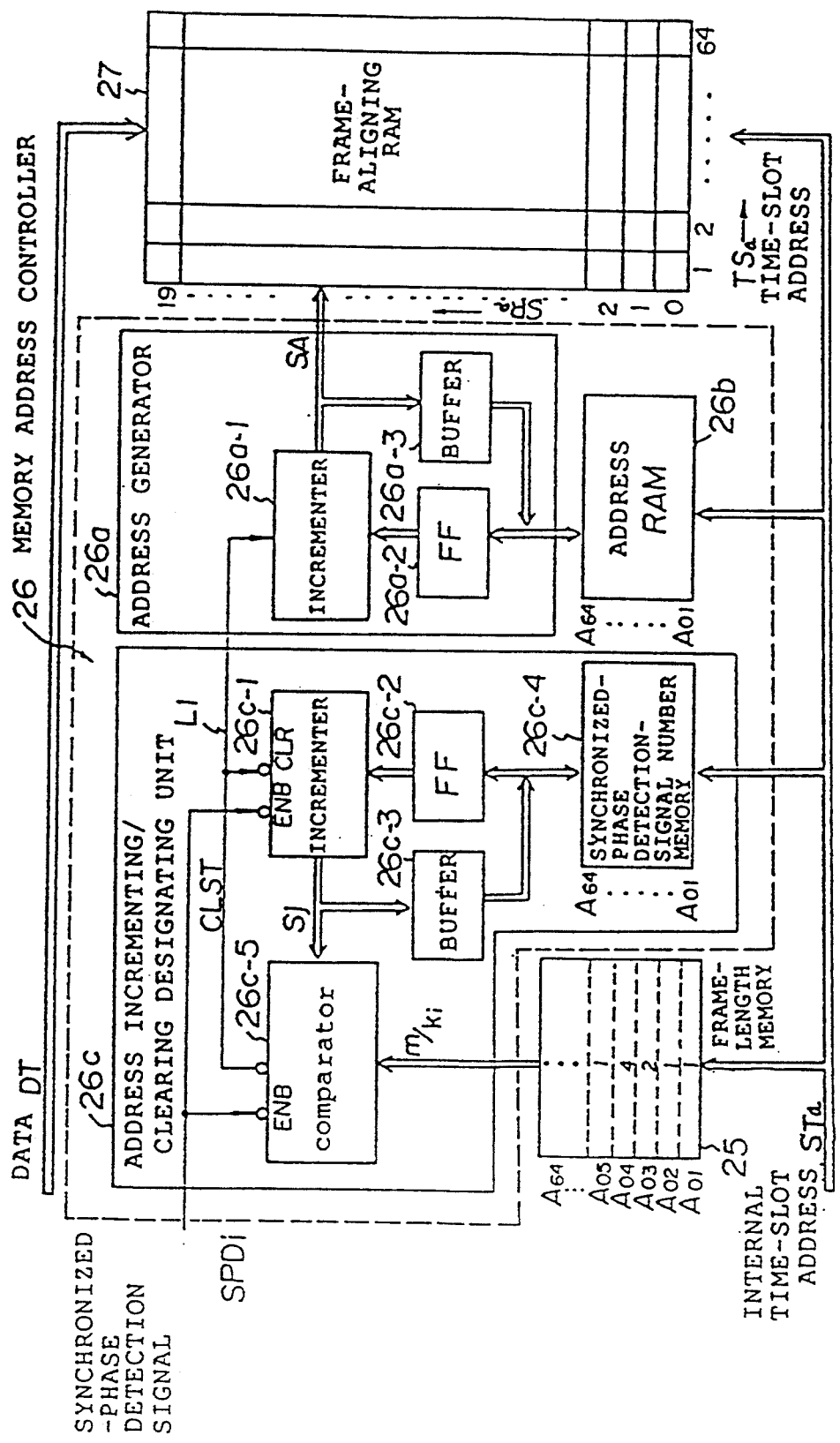
FIG. 15 is a block diagram of a phase synchronizer.

FIG. 15 is a block diagram showing the construction of the phase synchronizer. The frame-length memory 25 stores frame-length information of data allocated to the time-slots TS1~TSN (e.g., TS1~TS64) at addresses A01~A64 corresponding to these time slots. For example, if, among the variety of networks, the maximum frame length is m and the frame length of a network allocated to a prescribed time slot $TS_i$ is $k_i$, then $m/k_i$ (an integer) is stored as information representing the frame length (the smaller the value, the greater the frame length) at the address of the frame-length memory 25 that corresponds to the above-mentioned time slot. Accordingly, if the maximum frame length m is equal to 20 and it is assumed that (1) the data of the X.50 network ($k_i=20$) is allocated to the first time slot TS1;
(2) the data of the DDS20 network ($k_i=20$) is allocated to the second time slot TS2;
(3) the data of the DDS10 network ($k_i=10$) is allocated to the third time slot TS3;
(4) the data of the DDS5 network ($k_i=5$) is allocated to the fourth time slot TS4;
(5) the data of the special network ($k_i=20$) is allocated to the fifth time slot TS5;

and so on so that prescribed data are allocated to each time slot, then 1, 1, 2, 4, 1, ... will be stored at the addresses A01~A64 of the frame-length memory 25 in advance by means such as software.

It should be noted that $m/k_i$ is the number of time the synchronized-phase detection signals are generated in a relevant time slot during m (=20) frames. Accordingly, the information $m/k_i$ that has been stored in the frame-length memory 25 will hereinafter be referred to as the number of synchronized-phase detections.

On the basis of synchronized-phase detection signals SPD1~SPDn in the time slots, the memory address controller 26 generates addresses for rearranging the data of these time slots in memory upon taking frame length into consideration.

The frame aligning memory RAM 27 has m (=20) storage areas for each of the time slots TS1~TSN (N=64), for a total of m.N storage areas, assuming that m (e.g., 20) represents the maximum frame length. In other words, the frame aligning RAM 27 has an address space composed of time-slot addresses TSa (1~64) of 64 time slots along the horizontal axis and sub-rate addresses SRa (0~19) of 20 frames along the vertical axis. Data are successively stored in the storage areas designated by the sub-rate addresses SRa outputted from the memory address controller 26 every time slot.

Memory Address Controller

The memory address controller 26 includes an address generator 26a, an address RAM 26b and an address incrementing/clearing designating unit 26c. The address generator 26a updates and outputs the address (sub-rate address) of the frame aligning RAM 27 held every time slot, and stores the data in the storage area designated by the sub-rate address SRa and the time slot address TSa. The address RAM 26b stores the sub-rate address of the frame aligning RAM 27 corresponding to each time slot and has storage areas (addresses A01-~A64) for respective ones of the time slots (TS1~TS64). In response to generation of the synchronized-phase detection signal SPD in each time slot, the address incrementing/clearing designating unit 26c designates incrementing and zero-clearing of the address of this time slot upon taking frame length into consideration.

Operation of Address Generator

The address generator 26a has an incrementer 26a-1, a flip-flop 26a-2 and a buffer 26a-3. When the sub-rate address in the present time slot TSj is read out of the address RAM 26b and set in the flip-flop 26a-2, the incrementer 26a-1 increments the sub-rate address, which has been set in the flip-flop 26a-2, in a case where incrementing has been designated by the address incrementing/clearing designating unit 26c. Thereafter, the incrementer 26a-1 stores the incremented sub-rate address SRa at the address corresponding to the present time slot TSj of RAM 26b via the buffer 26a-3, outputs the sub-rate address SRa to the frame aligning RAM 27 and stores the data DT of the present time slot in the storage area of the frame aligning RAM 27 indicated by the time slot address TSa and the sub-rate address SRa.

On the other hand, in a case where zero-clearing is designated by the address incrementing/clearing designating unit 26c, the incrementer 26a-1 clears to zero the sub-rate address that has been stored in the flip-flop 26a-2, stores the zero-cleared sub-rate address SRa (=0) at the address corresponding to the present time slot TSj of the address RAM 26b via the buffer 26a-3, outputs the address to the frame aligning RAM 27 and stores the data DT in the storage area of the frame aligning RAM 27 indicated by the present time slot address TSa and the sub-rate address SRa (=0).

Operation of Address Incrementing/clearing Designating Unit

The address incrementing/clearing designating unit 26c has an incrementer 26c-1, a flip-flop 26c-2, a buffer 26c-3, a signal-number storing unit 26c-4 for storing the number (the initial value of which is zero) of times the synchronized-phase detection signal is generated in each time slot, and a comparator 26c-5.

The number of times Sj the synchronized-phase detection signal is generated in the present time slot TSj is read out of the storage unit 26c-4 and set in the flip-flop 26c-2. If the synchronized-phase detection signal SPD is not generated in this time slot, the incrementer 26c-1 does not perform an operation for incrementing the number Sj and stores Sj as is at the original address via the buffer. In addition, the comparator 26c-5 does not perform a comparison and outputs a high-level signal CLST (an incrementing command) on line L1 to cause the address generator 26a to increment the address.

On the other hand, if the synchronized-phase detection signal SPD is generated in the present time slot, the incrementer 26c-1 increments the number Sj and inputs this number to the comparator 26c-5. The latter performs monitoring to determine whether there is agreement between the number of times Sj the synchronized-phase detection signal SPD is generated in the present time slot and the number $m/k_i$ of synchronized-phase detections in the present time slot stored in the frame-length memory 25. If the two do not agree, the comparator 26c-5 outputs the high-level signal CLST (the incrementing command) on line L1, thereby causing the address generator 26a to increment the sub-rate address. In addition, the incrementer 26c-1 stores the number Sj at the original address of the storage unit 26c-4 via the buffer.

However, if the number of times Sj the synchronized-phase detection signal SPD is generated and the number $m/k_i$ of synchronized-phase detections in the present time slot stored in the frame-length memory 25 agree, the comparator 26c-5 outputs a low-level signal CLST (a zero-clearing command) on line L1, whereby the address generator 26a is made to clear the sub-rate address SRa to zero. Further, as a result of the zero-clearing command, the incrementer 26c-1 clears the number Sj to zero and stores the result at the original address of the storage unit 26c-4.

Overall Operation of Memory Address Controller

Figure 16:
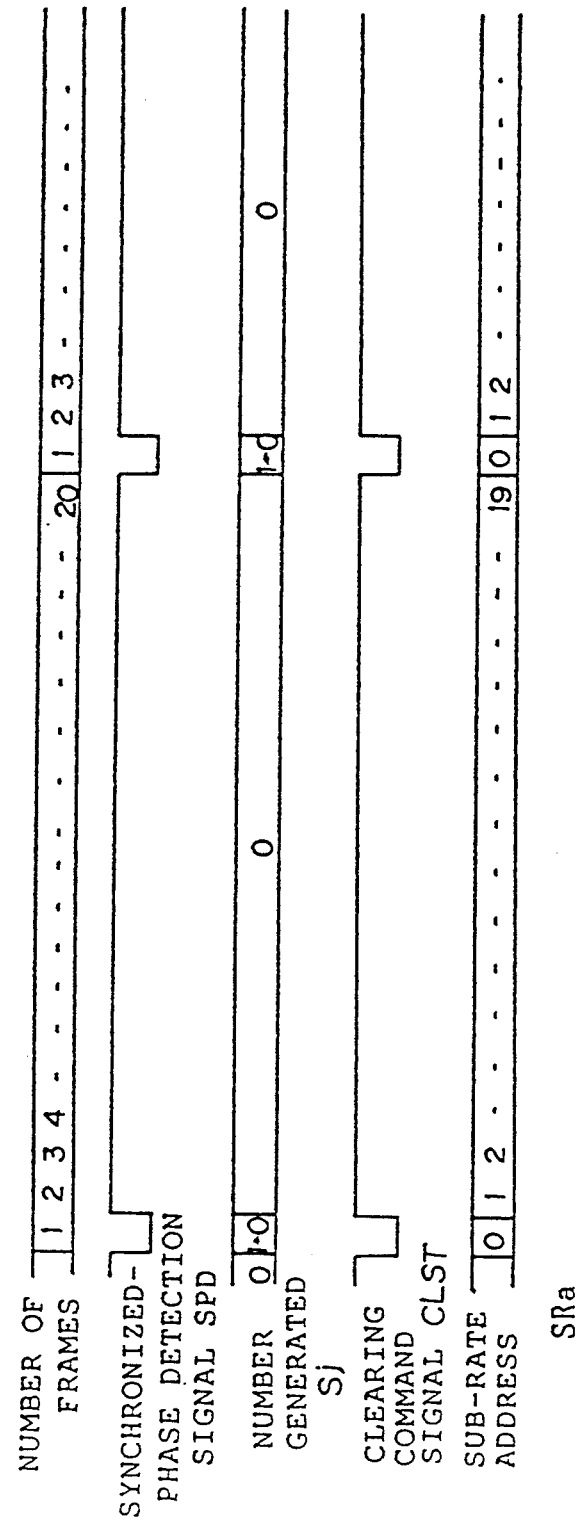
FIG. 16 is a time chart in case of a frame length of 20.
Figure 17:
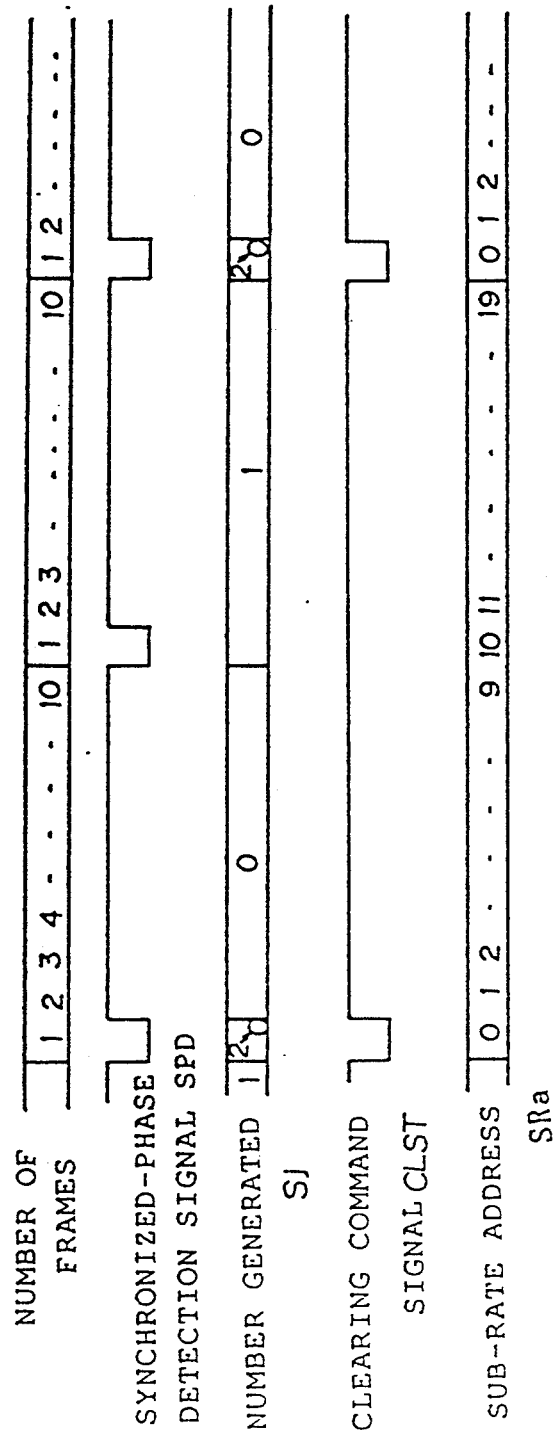
FIG. 17 is a time chart in case of a frame length of ten.
Figure 18:
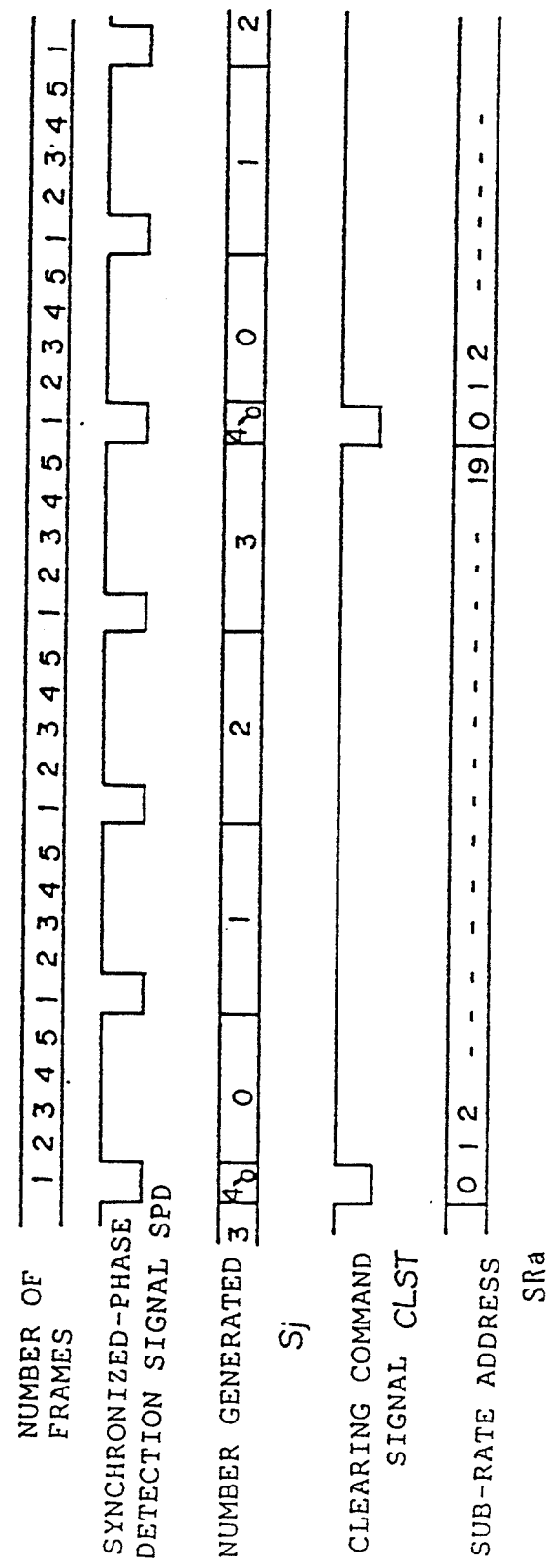
FIG. 18 is a time chart in case of a frame length of five.

FIGS. 16, 17 and 18 are time charts for describing the overall operation of the memory address controller 26 when the maximum frame length m is equal to 20. FIG. 16 illustrates address control in the X-50 network and DDS20 network, etc, having the frame length 20, FIG. 17 illustrates address control in the DDS10 network, having the frame length ten, and FIG. 18 illustrates address control in the DDS5 network of frame length five.

(a) When frame length is 20

In the case where frame length is 20 (FIG. 16), the synchronized-phase detection signal SPD is generated every 20 frames. Accordingly, if the synchronized-phase detection signal SPD is generated in the first frame, the number Sj of times the synchronized-phase detection signal is generated in the first frame will be one. In case of a frame length of 20, the number $m/k_i$ of synchronized-phase detections that has been stored in the frame-length memory 25 will be one. As a result, agreement is achieved, the address incrementing/clearing unit 26c immediately generates the low-level clearing command signal CLST and the number Sj is cleared to zero. In addition, the sub-rate address SRa is cleared to zero by the address generator 26a and data having a synchronizing bit S1 is stored in the storage area designated by this sub-rate address SRa (=0) and the present time-slot address TSa.

Thereafter, the synchronized-phase detection signal SPD is not generated for 20 frames. As a result, the sub-rate address SRa changes in the manner 0→1→2→3→ . . . →19 every frame and data having the synchronizing bits S2, S3, S4, ..., S20 are stored in the frame aligning RAM 27 in successive fashion.

FIG. 19 is a diagram for describing the the status of data storage in the frame aligning RAM 27. It will be understood that the data are stored in order in time slots TS1, 2, 5, 64 of frame length 20.

(b) When frame length is ten

In the case where frame length is ten (FIG. 17), the synchronized-phase detection signal SPD is generated every ten frames. Accordingly, if the synchronized-phase detection signal SPD is generated in the first frame, the number Sj of times the synchronized-phase detection signal is generated in the initial first frame will be two (assuming that the number was one immediately before). In case of a frame length of ten, the number $m/k_i$ of synchronized-phase detections that has been stored in the frame-length memory 25 will be two. As a result, agreement is achieved, the address incrementing/clearing unit 26c immediately generates the low-level clearing command signal CLST and the number Sj is cleared to zero. In addition, the sub-rate address SRa is cleared to zero by the address generator 26a and data having the synchronizing bit S1 is stored in the storage area designated by this sub-rate address SRa (=0).

Thereafter, the synchronized-phase detection signal SPD is not generated for ten frames. As a result, the sub-rate address SRa changes in the manner 0→1→2→3→ ... →9 every frame and data having the synchronizing bits S2, S3, S4, ..., S10 are stored in the frame aligning RAM 27 in successive fashion. In the next first frame, the synchronized-phase detection signal SPD is generated and the number Sj becomes one. However, agreement with the number $m/k_i$ of synchronized-phase detections is not achieved and the clearing command signal CLST assumes the high level (which designates the incrementing operation). Since the synchronized-phase detection signal SPD is not generated for the next ten frames, the sub-rate address SRa changes in the manner 10→11→12→13→ ... →19 every frame and data having the synchronizing bits S2, S3, S4, ..., S10 are stored in the frame aligning RAM 27 in successive fashion. In other words, the data are stored in order in the time slot TS2 of frame length ten, as illustrated in FIG. 19.

(c) When frame length is five

In the case where frame length is five (FIG. 18), the synchronized-phase detection signal SPD is generated every five frames. Accordingly, if the synchronized-phase detection signal SPD is generated in the first frame, the number Sj of times the synchronized-phase detection signal is generated in the initial first frame will be four (assuming that the number was three immediately before). In case of a frame length of five, the number $m/k_i$ of synchronized-phase detections that has been stored in the frame-length memory 25 will be four. As a result, agreement is achieved, the address incrementing/clearing unit 26c immediately generates the low-level clearing command signal CLST and the number Sj is cleared to zero. In addition, the sub-rate address SRa is cleared to zero by the address generator 26a and data having the synchronizing bit S1 is stored in the storage area designated by this sub-rate address SRa (=0).

Thereafter, the synchronized-phase detection signal SPD is not generated for five frames. As a result, the sub-rate address SRa changes in the manner 0→1→2→3→4 every frame and data having the synchronizing bits S2, S3, S4, S5 are stored in the frame aligning RAM 27 in successive fashion. In the next first frame, the synchronized-phase detection signal SPD is generated and the number Sj becomes one. However, agreement with the number $m/k_i$ of synchronized-phase detections is not achieved and the clearing command signal CLST assumes the high level (which designates the incrementing operation). Since the synchronized-phase detection signal SPD is not generated for the next five frames, the sub-rate address SRa changes in the manner 5→6→7→8→9 every frame and data having the synchronizing bits S2, S3, S4, ..., S10 are stored in the frame aligning RAM 27 in successive fashion. Thereafter, and in similar fashion, the sub-rate address SRa changes in the manner 10→11→12→13→ ... →19 and data having the synchronizing bits S1, S2, S3, S4, S5 are stored in the frame aligning RAM. In other words, the data are stored in order in the time slot TS4 of frame length five, as illustrated in FIG. 19.

In accordance with the present invention as set forth above, multiplex synchronizing processors are provided for respective ones of different frame patterns in various networks. When these processors have detected frame patterns designated form them, they generate synchronized-phase detection signals. In response to generation of the synchronized-phase detection signal in each time slot, the processors rearrange the data of the time slot in memory upon taking frame length into consideration, whereby the phases of the data are made identical before the data are outputted. As a result, even if networks having different frame patterns and different frame lengths are mixed and time-shared multiplexed data having different phases are received from the networks, the phases can be aligned with facility and a flexible network configuration can be achieved.

Further, in accordance with the present invention, a first multiplex synchronizing processor is constructed by a memory for storing the latest (f−1)-number of frame bits every time slot, a mixer for outputting an f-bit frame pattern upon combining a newly generated frame bit in a prescribed time slot and the latest (f−1)-number of frame bits in this time slot, a comparator for comparing the combined frame pattern and an f-bit frame pattern set in advance and outputting a synchronized-phase detection signal when the two compared patterns agree, and a storing unit for storing the latest (f−1)-number of frame bits in the memory. The other multiplex synchronizing processors are provided solely with a comparator and share the memory, mixer and storing unit provided in the first multiplex synchronizing processor. This makes it possible to reduce the hardware of the multiplex synchronizing processors as well as the cost thereof.

Further, in accordance with the present invention, if the maximum frame length is m (=20), a frame aligning RAM is provided with 20 storage areas for every time slot. In response to generation of a synchronized-phase detection signal, the data of frame length 20 (the data from an X.50 network, DDS20 network, individual network, etc.) are stored successively from the first to the 20th storage areas which correspond to the time slot allocated to these data. Then, in response to generation of another synchronized-phase detection signal, the data are stored again starting from the first storage area. Furthermore, in response to generation of a synchronized-phase detection signal, data of frame length k (=10 or 15) (data from a DDS10 network or DDS5 network) are stored successively from first to the k-th storage areas which correspond to the time slot allocated to these data. In response to generation of the next synchronized-phase detection signal, the data are stored successively from the (k+1)th storage area to the 2.k-th storage area which correspond to the time slot allocated to these data. Data are stored in similar fashion up to the 20th storage area. In response to generation of the next synchronized-phase detection signal, the data are again stored from the first storage area. As a result, even if frame length differs, the data are rearranged in the frame aligning RAM and the data are outputted upon bringing the phases into conformity.

In accordance with the present invention, there is provided a controller, which controls the generation of memory addresses, for updating and outputting data storage addresses for the frame aligning RAM every time slot. The data of a prescribed time slot are written in a storage area designated by the address of this prescribed time slot outputted from the controller. When data have been written up to the m-th storage area, the address of this time slot is cleared in response to generation of the next synchronized-phase detection signal. As a result of this arrangement, control for generating the memory addresses can be carried out by a circuit shared for all time slots. This makes it possible to reduce the amount of hardware and the cost thereof.

Further, in accordance with the present invention, if we let $k_i$ represent the frame length of data allocated to each time slot, $m/k_i$ (an integer) is correlated with the particular time slot and stored in a frame-length memory in advance, and monitoring is performed to determine whether $m/k_i$-number of the synchronized-phase detection signals have been generated with regard to the time slot. In response to generation of $m/k_i$-number of the synchronized-phase detection signals, the address of the pertinent time slot is cleared by an address generator. As a result of this arrangement, control for clearing addresses can be applied in common to all time slots, thereby making it possible to reduce the amount of hardware. Moreover, even if frame length differs, data can be rearranged in the frame aligning RAM simply and efficiently.

As many apparently widely different embodiments of the present invention can be made without departing from the spirit and scope thereof, it is to be understood that the invention is not limited to the specific embodiments thereof except as defined in the appended claims.

What is claimed is:

1. A hybrid multiplex synchronizing method in a data multiplex communication apparatus having multiplex synchronizing processors in which, when time-shared multiplexed data having prescribed frame patterns, some of which are different than others, are inputted in different phases every time slot, said multiplex synchronizing processors perform detection processing to detect frame patterns of time-shared multiplexed data allocated to said time slots and output synchronized-phase detection signals in response to detection of the frame patterns, and a phase synchronizer for rearranging the time-shared multiplexed data of each time slot in memory based upon the synchronized-phase detection signals and making the phases of the time-shared multiplexed data identical, said method comprising the steps of:

storing in advance, in correlation with time slots, information as to the types of frame patterns and frame lengths of time-shared multiplexed data allocated to each time slot, in a case where plural items of time-shared multiplexed data having different frame patterns and different frame lengths are processed;

providing multiplex synchronizing processors designated for respective ones of the frame patterns, performing frame-pattern detection processing in each of the multiplex synchronizing processors whenever a frame bit identifying one of the frame patterns is inputted, and outputting a synchronized-phase detection signal in response to detection of the frame pattern; and when the synchronized-phase detection signal is generated by a multiplex synchronizing processor conforming to the type of frame pattern which corresponds to a present time slot, as determined from the stored information, having said phase synchronizer rearrange the time-shared multiplexed data in the present time slot in memory, upon taking into consideration the frame length of these data, based upon the synchronized-phase detection signal, and similarly rearrange the time-shared multiplexed data of each time slot in memory to make the phases of the time-shared multiplexed data of the time slots identical to one another.

2. The method according to claim 1, wherein the multiplex synchronizing data has a one-bit frame bit attached thereto and a frame pattern is composed of a string of said frame bits.

3. The method according to claim 1, comprising the step of providing one of said multiplex synchronizing processors with:

a memory for storing the latest (f−1)-number of frame bits in correlation with each time slot, where f represents frame length;

a mixer for outputting an f-bit frame pattern upon combining a newly inputted frame bit in the present time slot and said latest (f−1)-number of frame bits which correspond to the present time slot;

a comparator for comparing the combined frame pattern and a frame pattern set in advance, and outputting a synchronized-phase detection signal when the two compared patterns agree; and a storing unit for storing the latest (f−1)-number of frame bits in said memory in correlation with the present time slot;

wherein the other multiplex synchronizing processors have solely a comparator and share the memory, mixer and storing unit provided in said one multiplex synchronizing processor.

4. The method according to claim 1, wherein said storing step is performed by providing memory having m-number of storage area which are first, second, . . . , m-th storage areas for every time slot, where m represents maximum frame length; and the following steps are performed in said phase synchronizer:

storing time-shared multiplexed data of frame length m allocated to a prescribed time slot in a first storage area conforming to said prescribed time slot in response to generation of the synchronized-phase detection signal, subsequently storing the time-shared multiplexed data of frame length m of said time slot in second, third, . . . , m-th storage areas successively until the synchronized-phase detection signal is generated, and storing the data from the first storage area again in response to generation of the synchronized-phase detection signal; and storing time-shared multiplexed data of frame length k, where k represents the frame length of time-shared multiplexed data allocated to each time slot, and where k equals the actual frame length of a higher number so that m/k is an integer, of a prescribed time slot in the first storage area conforming to said time slot in response to generation of the synchronized-phase detection signal, subsequently storing the time-shared multiplexed data of frame length k in second, third, . . . , k-th storage areas successively, storing the data in a (k+1)th storage are conforming to said time slot in response to generation of the next synchronized-phase detection signal, subsequently storing the time-shared multiplexed data of said time slot in (k+2)th, (k+3)th, . . . , 2 k-th storage area successively, and thereafter similarly storing the data up to the m-th storage area and again storing the data from the first storage area in response to generation of the next synchronized-phase detection signal.

5. The method according to claim 4, wherein said phase synchronizer has an address generator for updating and outputting sub-rate addresses, which indicate the storage areas of said memory, every time slot;

wherein the time-shared multiplexed data of the present time slot is written in a storage area designated by the sub-rate address of the present time slot outputted from said address generator; and when the time-shared multiplexed data have been written up to the m-th storage area every time slot, said address generator clears the sub-rate address of said time slot in response to generation of the next synchronized-phase detection signal.

6. The method according to claim 5, further comprising the steps of:

storing m/k in correlation with a time slot;

performing monitoring to determine whether m/k-number of the synchronized-phase detection signals have been generated with regard to said time slot;

incrementing the sub-rate address of said time slot in a case where m/k-number of the synchronized-phase detection signals have not been generated; and clearing the sub-rate address of said time slot in a case where m/k-number of the synchronized-phase detection signals have been generated.

7. A hybrid multiplex synchronizing apparatus in which, when time-shared multiplexed data having prescribed frame patterns and different frame lengths, some of which are different than others, are inputted in different phases every time slot, the data are transmitted upon making the phases of the time-shared multiplexed data in each time slot identical, comprising:

a memory for storing in advance, in correlation with time slots, information as to the types of frame patterns and frame lengths of the time-shared multiplexed data allocated to each time slot;

multiplex synchronizing processes designated for respective ones of different frame patterns for performing, for every time slot, frame-pattern detection of the time-shared multiplexed data allocated to said time slot, and outputting a synchronized-phase detection signal in response to detection of the frame pattern;

a frame aligning RAM having m-number of storage areas which are first, second, . . . , m-th storage areas for every time slot, where m represents maximum frame length;

a selector for selecting and outputting the synchronized-phase detection signal generated by a multiplex synchronizing processor conforming to the type of frame pattern which corresponds to a present time slot, as determined from the information stored in said memory; and a phase synchronizer which, on the basis of the synchronized-phase detection signal generated every time slot, stores the time-shared multiplexed data of each time slot in the corresponding m-number of storage areas of said frame aligning RAM in order, starting from the first storage area, upon taking into consideration the frame length, based upon the synchronized-phase detection signal, and makes the phases of the items of time-shared multiplexed data of the time slots identical to one another.

8. The apparatus according to claim 7, wherein one of said multiplex synchronizing processors includes:

a memory for storing the latest (f−1)-number of frame bits in correlation with each time slot, where f represents frame length;

a mixer for outputting an f-bit frame pattern upon combining a newly inputted frame bit in the present time slot and said latest (f−1)-number of frame bits which correspond to the present time slot;

a comparator for comparing the combined frame pattern and a frame pattern set in advance, and outputting a synchronized-phase detection signal when the two compared patterns agree; and a storing unit for storing the latest (f−1)-number of frame bits in said memory in correlation with the present time slot;

wherein the other multiplex synchronizing processors have solely a comparator and share the memory, mixer and storing unit provided in said one multiplex synchronizing processor.

9. The apparatus according to claim 7, wherein said phase synchronizer:

stores time-shared multiplexed data of frame length m allocated to a prescribed time slot in a first storage area conforming to said time slot in response to generation of the synchronized-phase detection signal, subsequently stores the time-shared multiplexed data of frame length m of said time slot in second, third, . . . , m-th storage areas successively until the synchronized-phase detection signal is generated, and stores the data from the first storage area again in response to generation of the synchronized-phase detection signal; and store time-shared multiplexed data of frame length k, where k represents the frame length of time-shared multiplexed data allocated to each time slot and where k equals the actual frame length or a higher number so that m/k is an integer, of a prescribed time slot in the first storage area conforming to said time slot in response to generation of the synchronized-phase detection signal, subsequently stores the time-shared multiplexed data of frame length k in second, third, . . . , k-th storage area successively, stores the data in a (k+1) th storage area conforming to said time slot in response to generation of the next synchronized-phase detection signal, subsequently stores the time-shared multiplexed data of said time slot in (k+2)th, (k+3)th, . . . , 2 k-th storage areas successively, and thereafter similarly stores the data up to the m-th storage area and again stores the data from the first storage area in response to generation of the next synchronized-phase detection signal.

10. The apparatus according to claim 9, wherein said phase synchronizer has an address generator for updating and outputting sub-rate addresses, which indicate the storage areas of said frame aligning RAM, every time slot;

wherein the time-shared multiplexed data of the present time slot is written in a storage area designated by the sub-rate address of the present time slot outputted from said address generator; and after the time-shared multiplexed data have been written up to the m-th storage area every time slot, the sub-rate address of said time slot is cleared in response to generation of the synchronized-phased detection signal and the time-shared multiplexed data are stored from the first storage area.

11. The apparatus according to claim 10, wherein said phase synchronizer further comprises a memory for storing m/k in correlation with a particular time slot; and an address incrementing/clearing designating unit for performing monitoring to determine whether m/k-number of the synchronized-phase detection signals have been generated with regard to said time slot, inputting to the address generator a signal which designates incrementing of the sub-rate address of said time slot in a case where m/k-number of the synchronized-phase detection signals have not been generated, and inputting to the address generator a signal which designates clearing of the sub-rate address of said time slot in a case where m/k-number of the synchronized-phase detection signals have been generated.

* * * * *

UNITED STATES PATENT AND TRADEMARK OFFICE
CERTIFICATE OF CORRECTION

PATENT NO. : 5,317,572
DATED : May 31, 1994
INVENTOR(S) : Satoh

It is certified that error appears in the above-indentified patent and that said Letters Patent is hereby corrected as shown below:

Column 1, line 59, delete "5A" and insert --5--.

Figure 1:
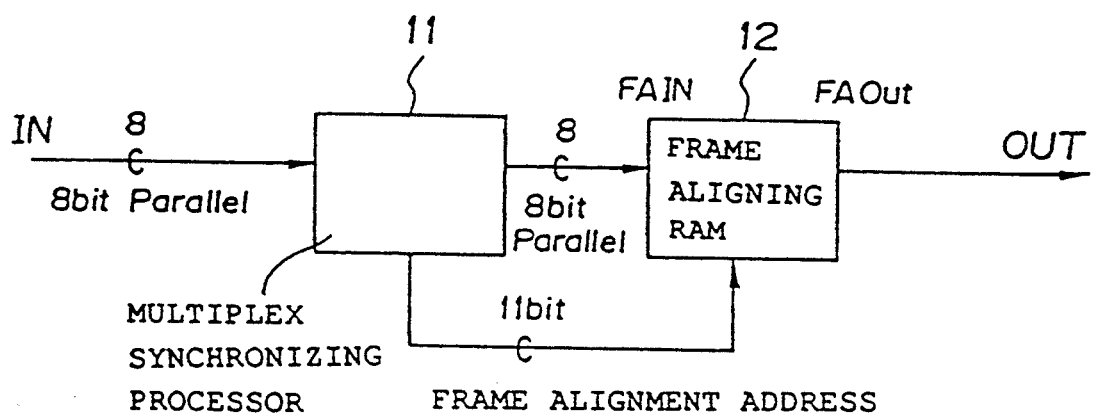
FIG. 1 is a block diagram illustrating a multiplex synchronizing processing apparatus according to the prior art.
Figure 2:
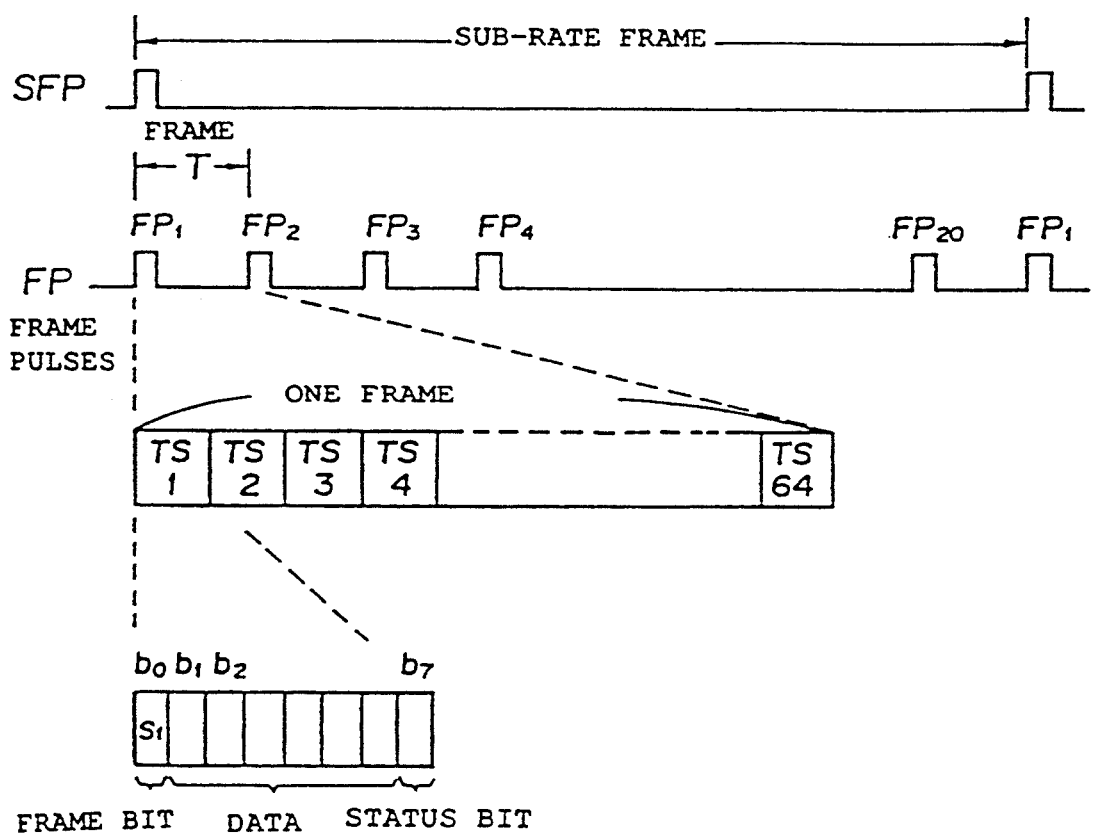
FIG. 2 is a diagram showing the relationship between frames, time slots and data.
Figure 3:
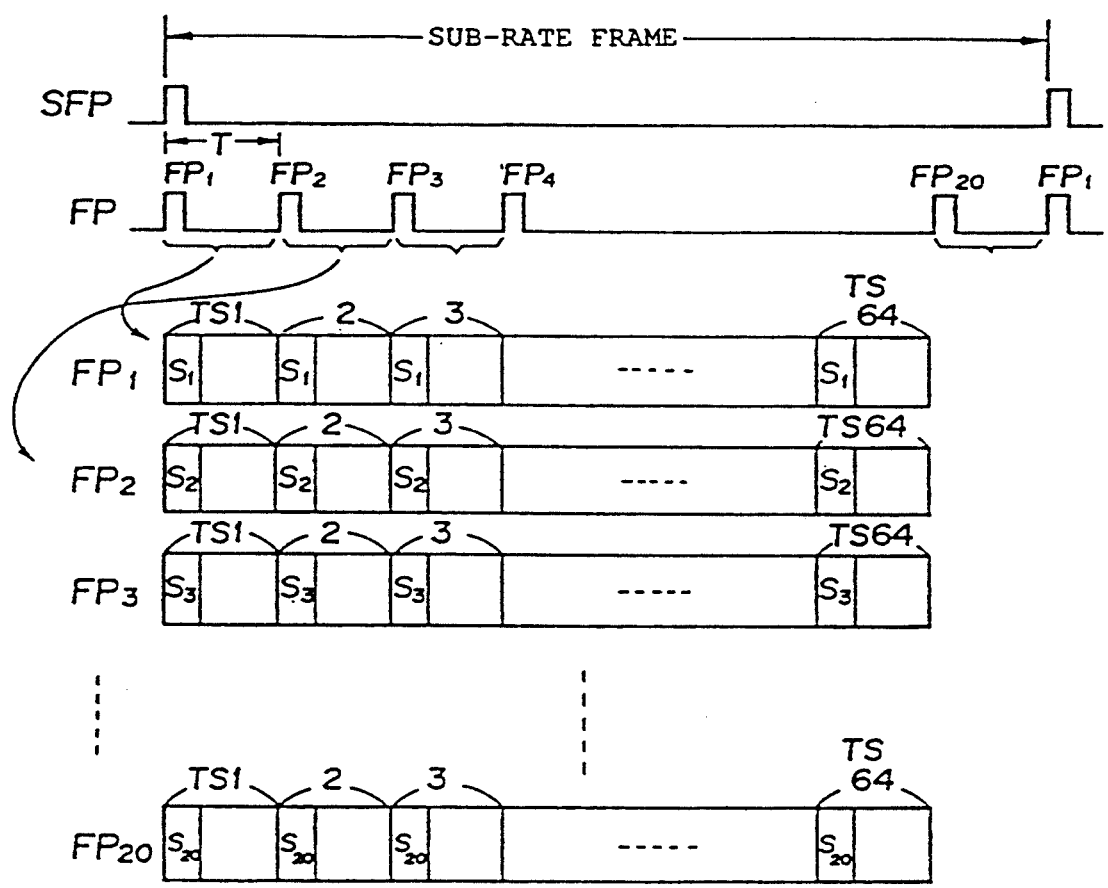
FIG. 3 is a diagram showing the constitution of frame data in a case where synchronization has been achieved.
Figure 4:
FIG. 4 is a diagram for describing synchronization patterns.
Figure 5:
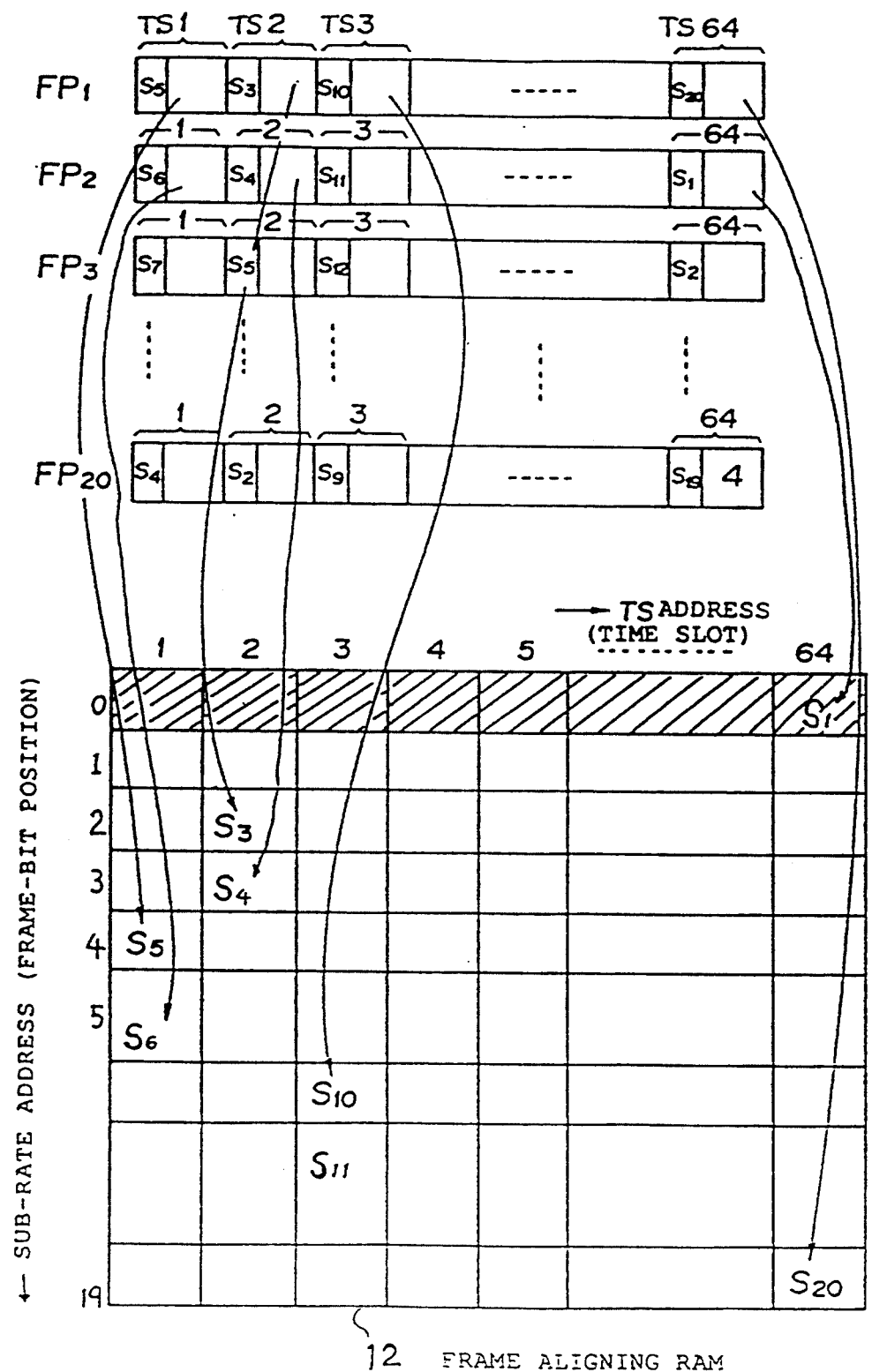
FIG. 5 is a diagram for describing multiplex synchronizing processing.
Figure 6:
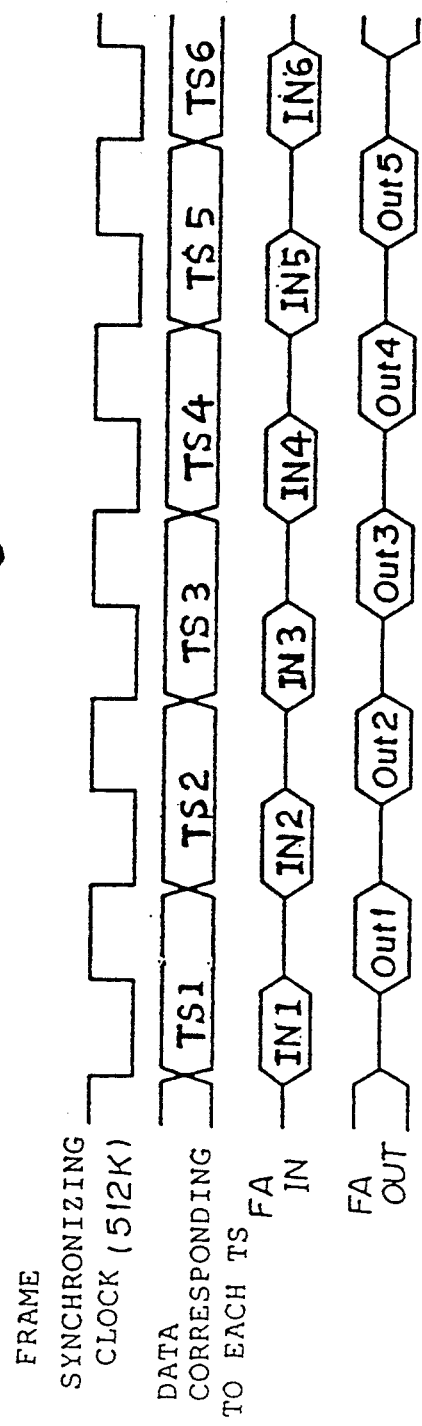
FIG. 6 is an overall time chart of synchronizing processing.
Figure 7:
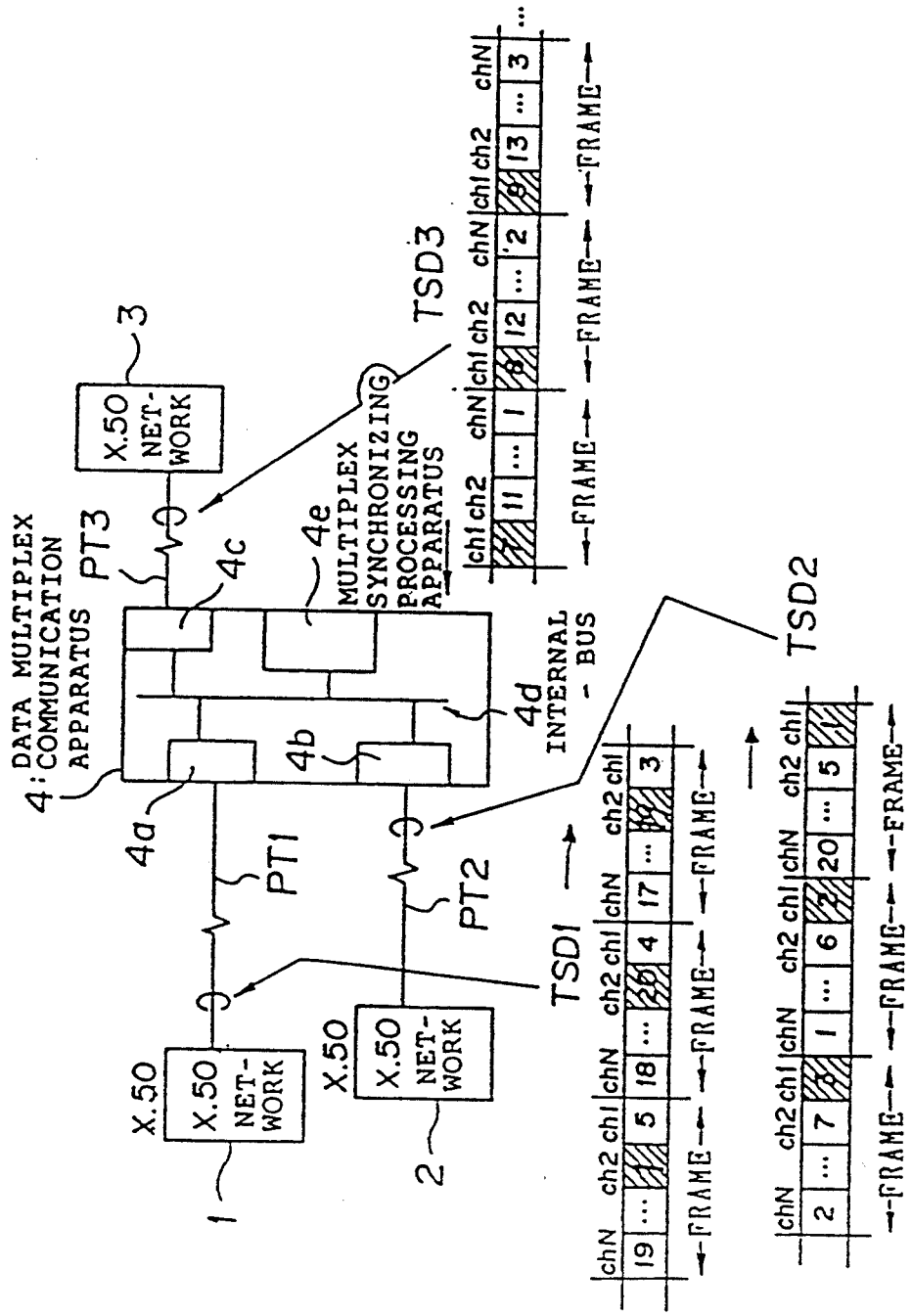
FIG. 7 is an overall view of the system of X.50 networks.
Figure 8:
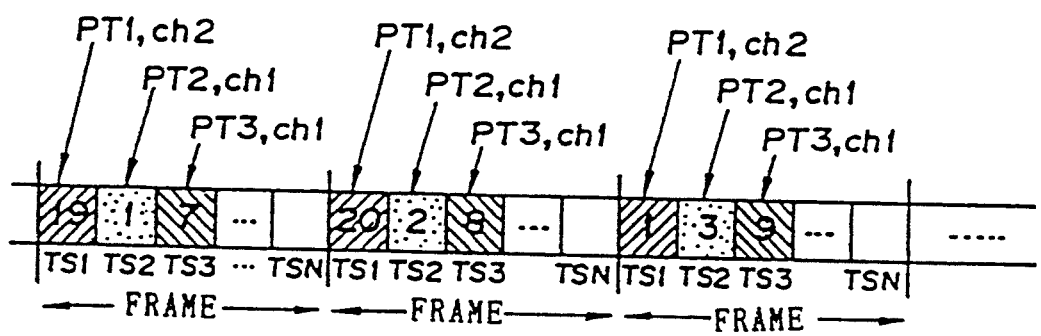
FIG. 8 shows an example of time-shared multiplexed data.

Column 1, lines 60-61, delete "as shown in Fig. 5B,".

Column 1, line 66, delete "as depicted in Fig. 5B,".

Column 6, line 36, delete "6b" and insert --6c--.

Column 9, line 2, delete "and" and insert --as--.

Column 14, line 24, delete "form" and insert --for--.

Signed and Sealed this

Tenth Day of October, 1995

Attest:

BRUCE LEHMAN

Attesting Officer

Commissioner of Patents and Trademarks